(12) United States Patent
Callaghan

(10) Patent No.: US 7,636,044 B1
(45) Date of Patent: Dec. 22, 2009

(54) RFID TAG PROGRAMMING, PRINTING APPLICATION, AND SUPPLY CHAIN/GLOBAL REGISTRATION ARCHITECTURE

(75) Inventor: David M. Callaghan, Concord, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 488 days.

(21) Appl. No.: 11/129,199

(22) Filed: May 13, 2005

(51) Int. Cl.
*G08B 13/14* (2006.01)
(52) U.S. Cl. ........... 340/568.1; 340/539.1; 340/825.69; 340/572.1
(58) Field of Classification Search ... 340/572.1–572.9, 340/568.1, 10.1, 5.6, 825, 825.69, 438, 539.1
See application file for complete search history.

(56) References Cited

U.S. PATENT DOCUMENTS

| | | |
|---|---|---|
| 3,858,212 A | 12/1974 | Tompkins et al. |
| 4,949,299 A | 8/1990 | Pickett et al. |
| 5,300,875 A | 4/1994 | Tuttle |
| 5,461,666 A | 10/1995 | McMahan et al. |
| 5,613,228 A | 3/1997 | Tuttle et al. |
| 5,621,199 A | 4/1997 | Calari et al. |
| 5,629,981 A | 5/1997 | Nerlikar |
| 5,689,415 A | 11/1997 | Calotychos et al. |
| 5,701,127 A | 12/1997 | Sharpe |
| 5,703,347 A | 12/1997 | Reddersen et al. |
| 5,785,181 A | 7/1998 | Quartararo, Jr. |
| 5,798,693 A | 8/1998 | Engellenner |
| 5,822,714 A | 10/1998 | Cato |
| 5,874,724 A | 2/1999 | Cato |
| 5,874,896 A | 2/1999 | Lowe et al. |
| 5,905,249 A | 5/1999 | Reddersen et al. |
| 5,910,776 A | 6/1999 | Black |
| 5,949,335 A * | 9/1999 | Maynard ............. 340/572.1 |
| 5,963,134 A | 10/1999 | Bowers et al. |

(Continued)

FOREIGN PATENT DOCUMENTS

DE 10314260 A1 10/2004

(Continued)

OTHER PUBLICATIONS

Partial International Search Report dated Mar. 30, 2006, for PCT Application Serial No. PCT/EP2005/007878, 3 pages.

(Continued)

*Primary Examiner*—Daniel Previl
(74) *Attorney, Agent, or Firm*—Turocy & Watson LLP; R. Scott Speroff

(57) ABSTRACT

Integration of Radio Frequency Identification (RFID) technology with an industrial controller to facilitate RFID tag printing and application of the RFID tags to manufactured items. RFID tags are printed based on RFID tag information that is generated and/or received by the industrial controller. A middleware software module can be included in the industrial controller to organize and schedule the RFID tag information in a manner compatible with an RFID tag printer. The RFID tag printer accesses the organized RFID tag information and tag printing occurs in conjunction with one or more industrial processes. The industrial controller can update a global registry with RFID tag information associated with printed RFID tags. The registry update procedure can be facilitated by creating email messages related to the RFID tags that have been created.

33 Claims, 10 Drawing Sheets

U.S. PATENT DOCUMENTS

| | | |
|---|---|---|
| 5,964,656 A | 10/1999 | Lawler, Jr. et al. |
| 5,971,587 A | 10/1999 | Kato et al. |
| 5,973,600 A | 10/1999 | Mosher, Jr. |
| 6,049,745 A | 4/2000 | Douglas et al. |
| 6,091,998 A | 7/2000 | Vasko et al. |
| 6,115,616 A | 9/2000 | Halperin et al. |
| 6,116,505 A | 9/2000 | Withrow |
| 6,121,878 A | 9/2000 | Brady et al. |
| 6,144,301 A | 11/2000 | Frieden |
| 6,150,948 A | 11/2000 | Watkins |
| 6,154,790 A | 11/2000 | Pruett et al. |
| 6,169,483 B1 * | 1/2001 | Ghaffari et al. .......... 340/572.3 |
| 6,170,059 B1 | 1/2001 | Pruett et al. |
| 6,172,609 B1 | 1/2001 | Lu et al. |
| 6,205,362 B1 | 3/2001 | Eidson |
| 6,211,789 B1 | 4/2001 | Oldham et al. |
| 6,263,440 B1 | 7/2001 | Pruett et al. |
| 6,264,106 B1 | 7/2001 | Bridgelall |
| 6,265,976 B1 | 7/2001 | Roesner et al. |
| 6,272,321 B1 | 8/2001 | Bruhnke et al. |
| 6,275,681 B1 | 8/2001 | Vega et al. |
| 6,282,407 B1 | 8/2001 | Vega et al. |
| 6,285,295 B1 | 9/2001 | Casden |
| 6,286,762 B1 | 9/2001 | Reynolds et al. |
| 6,286,763 B1 | 9/2001 | Reynolds et al. |
| 6,293,467 B1 | 9/2001 | Reddersen et al. |
| 6,305,548 B1 | 10/2001 | Sato et al. |
| 6,307,517 B1 | 10/2001 | Lee |
| 6,317,027 B1 | 11/2001 | Watkins |
| 6,318,636 B1 | 11/2001 | Reynolds et al. |
| 6,330,971 B1 | 12/2001 | Mabry et al. |
| 6,342,839 B1 | 1/2002 | Curkendall et al. |
| 6,354,493 B1 | 3/2002 | Mon |
| 6,362,738 B1 | 3/2002 | Vega |
| 6,366,206 B1 | 4/2002 | Ishikawa et al. |
| 6,377,176 B1 | 4/2002 | Lee |
| 6,377,203 B1 | 4/2002 | Doany |
| 6,377,764 B1 | 4/2002 | Morris-Jones |
| 6,392,544 B1 | 5/2002 | Collins et al. |
| 6,400,272 B1 | 6/2002 | Holtzman et al. |
| 6,401,936 B1 | 6/2002 | Isaacs |
| 6,409,401 B1 | 6/2002 | Petteruti et al. |
| 6,415,978 B1 | 7/2002 | McAllister |
| 6,429,776 B1 | 8/2002 | Alicot et al. |
| 6,445,297 B1 | 9/2002 | Nicholson |
| 6,445,969 B1 | 9/2002 | Kenney |
| 6,448,886 B2 | 9/2002 | Garber et al. |
| 6,451,154 B1 | 9/2002 | Grabau |
| 6,476,708 B1 | 11/2002 | Johnson |
| 6,480,100 B1 | 11/2002 | Frieden et al. |
| 6,484,886 B1 | 11/2002 | Isaacs |
| 6,486,780 B1 | 11/2002 | Garber |
| 6,501,382 B1 | 12/2002 | Rehfus |
| 6,505,780 B1 | 1/2003 | Yassin et al. |
| 6,517,000 B1 | 2/2003 | McAllister et al. |
| 6,523,752 B2 | 2/2003 | Nishitani et al. |
| 6,529,880 B1 | 3/2003 | McKeen et al. |
| 6,547,040 B2 | 4/2003 | Goodwin, III |
| 6,549,064 B2 | 4/2003 | Bandy et al. |
| 6,554,187 B2 | 4/2003 | Otto |
| 6,563,425 B2 | 5/2003 | Nicholson et al. |
| 6,566,997 B1 | 5/2003 | Bradin |
| 6,585,165 B1 | 7/2003 | Kuroda |
| 6,593,853 B1 | 7/2003 | Barrett et al. |
| 6,600,418 B2 | 7/2003 | Francis et al. |
| 6,607,123 B1 | 8/2003 | Jolliffee et al. |
| 6,608,551 B1 | 8/2003 | Anderson et al. |
| 6,608,561 B2 | 8/2003 | Lawler, Jr. et al. |
| 6,612,495 B2 | 9/2003 | Reddersen et al. |
| 6,617,962 B1 | 9/2003 | Horwitz et al. |
| 6,621,417 B2 | 9/2003 | Duncan et al. |
| 6,622,567 B1 | 9/2003 | Hamel et al. |
| 6,641,042 B1 | 11/2003 | Pierenkemper et al. |
| 6,650,227 B1 | 11/2003 | Bradin |
| 6,664,897 B2 | 12/2003 | Pape et al. |
| 6,669,089 B2 | 12/2003 | Cybulski et al. |
| 6,672,512 B2 | 1/2004 | Bridgelall |
| 6,677,852 B1 | 1/2004 | Landt |
| 6,687,293 B1 | 2/2004 | Loyer et al. |
| 6,693,539 B2 | 2/2004 | Bowers et al. |
| 6,700,931 B1 | 3/2004 | Lee et al. |
| 6,707,376 B1 | 3/2004 | Patterson et al. |
| 6,712,276 B1 | 3/2004 | Abali et al. |
| 6,714,121 B1 | 3/2004 | Moore |
| 6,724,308 B2 | 4/2004 | Nicholson |
| 6,726,099 B2 | 4/2004 | Becker et al. |
| 6,745,008 B1 | 6/2004 | Carrender et al. |
| 6,747,560 B2 | 6/2004 | Stevens, III |
| 6,750,769 B1 | 6/2004 | Smith |
| 6,752,277 B1 | 6/2004 | Sempliner |
| 6,784,789 B2 | 8/2004 | Eroglu et al. |
| 6,784,813 B2 | 8/2004 | Shanks et al. |
| 6,791,603 B2 | 9/2004 | Lazo et al. |
| 6,793,127 B2 | 9/2004 | Alsafadi et al. |
| 6,802,659 B2 * | 10/2004 | Cremon et al. ................. 400/76 |
| 6,808,116 B1 | 10/2004 | Eslambolchi |
| 6,809,646 B1 | 10/2004 | Lee |
| 6,812,838 B1 | 11/2004 | Maloney |
| 6,816,817 B1 | 11/2004 | Retlich |
| 6,828,902 B2 | 12/2004 | Casden |
| 6,842,106 B2 | 1/2005 | Hughes et al. |
| 6,847,856 B1 | 1/2005 | Bohannon |
| 6,853,294 B1 | 2/2005 | Ramamurthy et al. |
| 6,853,303 B2 | 2/2005 | Chen et al. |
| 6,859,757 B2 * | 2/2005 | Muehl et al. ................. 702/184 |
| 6,870,797 B2 | 3/2005 | Reasoner et al. |
| 6,873,260 B2 | 3/2005 | Lancos et al. |
| 6,879,809 B1 | 4/2005 | Vega et al. |
| 6,888,459 B2 | 5/2005 | Stilp |
| 6,897,763 B2 | 5/2005 | Schulmerich et al. |
| 6,899,476 B1 | 5/2005 | Barrus et al. |
| 6,901,304 B2 | 5/2005 | Swan et al. |
| 6,903,656 B1 | 6/2005 | Lee |
| 6,917,291 B2 | 7/2005 | Allen |
| 6,918,541 B2 | 7/2005 | Knowles et al. |
| 6,929,412 B1 | 8/2005 | Barrus et al. |
| 6,935,560 B2 | 8/2005 | Andreasson et al. |
| 6,940,408 B2 | 9/2005 | Ferguson et al. |
| 6,943,678 B2 | 9/2005 | Muirhead |
| 6,943,688 B2 | 9/2005 | Chung et al. |
| 6,967,579 B1 | 11/2005 | Elizondo |
| 6,975,229 B2 | 12/2005 | Carrender et al. |
| 6,992,574 B2 * | 1/2006 | Aupperle et al. ............ 340/505 |
| 6,999,955 B1 | 2/2006 | Horvitz |
| 7,023,342 B2 | 4/2006 | Corbett et al. |
| 7,036,729 B2 | 5/2006 | Chung |
| 7,057,509 B2 | 6/2006 | Gualdi et al. |
| 7,061,379 B2 | 6/2006 | Chen et al. |
| 7,066,388 B2 | 6/2006 | He |
| 7,066,667 B2 * | 6/2006 | Chapman et al. .............. 400/76 |
| 7,069,100 B2 | 6/2006 | Monette et al. |
| 7,073,712 B2 | 7/2006 | Jusas et al. |
| 7,075,412 B1 | 7/2006 | Reynolds et al. |
| 7,079,023 B2 | 7/2006 | Haller |
| 7,084,769 B2 | 8/2006 | Bauer et al. |
| 7,114,655 B2 * | 10/2006 | Chapman et al. ........ 235/462.01 |
| 7,127,507 B1 * | 10/2006 | Clark et al. ................. 709/224 |
| 7,135,976 B2 | 11/2006 | Neff et al. |
| 7,151,456 B2 | 12/2006 | Godfrey |
| 7,165,722 B2 | 1/2007 | Shafer et al. |
| 7,183,922 B2 | 2/2007 | Mendolia et al. |
| 7,187,288 B2 | 3/2007 | Mendolia et al. |
| 7,194,072 B2 | 3/2007 | Gamble |
| 7,195,159 B2 | 3/2007 | Sloan et al. |

| | | |
|---|---|---|
| 7,212,637 B2 * | 5/2007 | Salisbury .................... 380/270 |
| 7,221,258 B2 | 5/2007 | Lane et al. |
| 7,230,730 B2 * | 6/2007 | Owen et al. ................. 358/1.14 |
| 7,240,027 B2 | 7/2007 | McConnell et al. |
| 7,272,502 B2 | 9/2007 | Lee et al. |
| 7,336,167 B2 * | 2/2008 | Olsen et al. ............... 340/539.1 |
| 7,336,243 B2 | 2/2008 | Jo et al. |
| 7,373,087 B2 | 5/2008 | Shi et al. |
| 7,388,491 B2 | 6/2008 | Chand et al. |
| 7,389,921 B2 | 6/2008 | Lin et al. |
| 7,486,181 B2 | 2/2009 | Olsen et al. |
| 7,510,110 B2 | 3/2009 | Pietrzyk et al. |
| 2001/0000019 A1 | 3/2001 | Bowers et al. |
| 2001/0008390 A1 | 7/2001 | Berquist |
| 2001/0015760 A1 | 8/2001 | Fellegara et al. |
| 2002/0005774 A1 | 1/2002 | Rudolph |
| 2002/0067265 A1 | 6/2002 | Rudolph |
| 2002/0070862 A1 | 6/2002 | Francis et al. |
| 2002/0130778 A1 | 9/2002 | Nicholson |
| 2002/0143320 A1 | 10/2002 | Levin |
| 2002/0165758 A1 | 11/2002 | Hind et al. |
| 2002/0167397 A1 | 11/2002 | Eroglu et al. |
| 2002/0185532 A1 | 12/2002 | Berquist et al. |
| 2003/0007473 A1 | 1/2003 | Strong et al. |
| 2003/0023337 A1 | 1/2003 | Godfrey et al. |
| 2003/0102367 A1 | 6/2003 | Monette et al. |
| 2003/0109951 A1 | 6/2003 | Hsiung et al. |
| 2003/0150908 A1 | 8/2003 | Pokorny et al. |
| 2003/0169149 A1 | 9/2003 | Ohki et al. |
| 2003/0203730 A1 | 10/2003 | Wan et al. |
| 2003/0216969 A1 | 11/2003 | Bauer et al. |
| 2004/0024644 A1 | 2/2004 | Gui et al. |
| 2004/0032443 A1 | 2/2004 | Moylan |
| 2004/0061324 A1 | 4/2004 | Howard |
| 2004/0062294 A1 | 4/2004 | Clemens et al. |
| 2004/0066281 A1 | 4/2004 | Hughes et al. |
| 2004/0069851 A1 | 4/2004 | Grunes |
| 2004/0084526 A1 | 5/2004 | Knowles et al. |
| 2004/0095910 A1 | 5/2004 | Metts et al. |
| 2004/0108378 A1 | 6/2004 | Gatz |
| 2004/0124988 A1 | 7/2004 | Leonard et al. |
| 2004/0160324 A1 | 8/2004 | Stilp |
| 2004/0181467 A1 | 9/2004 | Raiyani et al. |
| 2004/0189443 A1 | 9/2004 | Eastburn |
| 2004/0220860 A1 | 11/2004 | Persky et al. |
| 2005/0012613 A1 | 1/2005 | Eckstein et al. |
| 2005/0021369 A1 | 1/2005 | Cohen et al. |
| 2005/0035849 A1 | 2/2005 | Yizhack |
| 2005/0040934 A1 | 2/2005 | Shanton |
| 2005/0052283 A1 | 3/2005 | Collins et al. |
| 2005/0058483 A1 | 3/2005 | Chapman et al. |
| 2005/0062603 A1 | 3/2005 | Fuerst et al. |
| 2005/0083180 A1 | 4/2005 | Horwitz |
| 2005/0088299 A1 | 4/2005 | Bandy et al. |
| 2005/0092825 A1 | 5/2005 | Cox et al. |
| 2005/0093678 A1 | 5/2005 | Forster et al. |
| 2005/0093703 A1 | 5/2005 | Twitchell |
| 2005/0099268 A1 | 5/2005 | Juels et al. |
| 2005/0110641 A1 | 5/2005 | Mendolia et al. |
| 2005/0219039 A1 | 5/2005 | Edwards |
| 2005/0135181 A1 | 6/2005 | Shionoiri et al. |
| 2005/0140511 A1 | 6/2005 | Bonnell et al. |
| 2005/0143026 A1 | 6/2005 | Bellantoni |
| 2005/0143916 A1 | 6/2005 | Kim et al. |
| 2005/0145688 A1 | 7/2005 | Milenkovic et al. |
| 2005/0149414 A1 | 7/2005 | Schrodt et al. |
| 2005/0154572 A1 | 7/2005 | Sweeney |
| 2005/0155213 A1 | 7/2005 | Eastin |
| 2005/0159913 A1 | 7/2005 | Ariyoshi et al. |
| 2005/0162256 A1 | 7/2005 | Kinoshita |
| 2005/0170784 A1 | 8/2005 | Ariyoshi et al. |
| 2005/0177423 A1 | 8/2005 | Swanson |
| 2005/0177466 A1 | 8/2005 | Willins |
| 2005/0179521 A1 | 8/2005 | Pillai et al. |
| 2005/0180566 A1 | 8/2005 | Ryal |
| 2005/0188095 A1 | 8/2005 | Gardiner et al. |
| 2005/0190098 A1 | 9/2005 | Bridgelall et al. |
| 2005/0192727 A1 | 9/2005 | Shostak et al. |
| 2005/0197775 A1 | 9/2005 | Smith |
| 2005/0200457 A1 | 9/2005 | Bridgelall et al. |
| 2005/0206552 A1 | 9/2005 | Friedrich |
| 2005/0206555 A1 | 9/2005 | Bridgelall et al. |
| 2005/0212660 A1 | 9/2005 | Hansen et al. |
| 2005/0212673 A1 | 9/2005 | Forster |
| 2005/0212676 A1 | 9/2005 | Steinberg |
| 2005/0228528 A1 | 10/2005 | Farchmin et al. |
| 2005/0237162 A1 | 10/2005 | Hyde et al. |
| 2005/0240305 A1 | 10/2005 | Bogash et al. |
| 2005/0253717 A1 | 11/2005 | Howarth et al. |
| 2005/0253718 A1 * | 11/2005 | Droms et al. ............ 340/572.1 |
| 2005/0258955 A1 | 11/2005 | Gloekler et al. |
| 2005/0269407 A1 | 12/2005 | Harmon |
| 2006/0006231 A1 | 1/2006 | Anson et al. |
| 2006/0027658 A1 | 2/2006 | Genc et al. |
| 2006/0038077 A1 | 2/2006 | Olin et al. |
| 2006/0049250 A1 | 3/2006 | Sullivan |
| 2006/0053234 A1 | 3/2006 | Kumar et al. |
| 2006/0055508 A1 | 3/2006 | Kumar et al. |
| 2006/0060657 A1 * | 3/2006 | Choong et al. ............... 235/492 |
| 2006/0071774 A1 | 4/2006 | Brown et al. |
| 2006/0125653 A1 | 6/2006 | McQuade |
| 2006/0145850 A1 | 7/2006 | Krstulich |
| 2006/0170565 A1 | 8/2006 | Husak et al. |
| 2006/0200256 A1 | 9/2006 | Mason et al. |
| 2006/0208859 A1 | 9/2006 | Hougen et al. |
| 2006/0232382 A1 | 10/2006 | Bauer et al. |
| 2006/0279412 A1 | 12/2006 | Holland et al. |
| 2007/0008073 A1 | 1/2007 | Poasevara |
| 2007/0013517 A1 | 1/2007 | Posamentier |
| 2007/0013519 A1 | 1/2007 | Chung et al. |
| 2007/0035396 A1 | 2/2007 | Chand et al. |
| 2007/0040681 A1 | 2/2007 | Jessup |
| 2007/0063029 A1 | 3/2007 | Brandt et al. |
| 2007/0137531 A1 | 6/2007 | Muirhead |
| 2007/0159311 A1 | 7/2007 | Schober |
| 2007/0205860 A1 | 9/2007 | Jones et al. |
| 2007/0205861 A1 | 9/2007 | Nair et al. |

FOREIGN PATENT DOCUMENTS

| | | |
|---|---|---|
| EP | 1542105 A | 6/2005 |
| WO | 0016289 | 3/2000 |
| WO | 0058752 | 10/2000 |
| WO | 0169516 | 9/2001 |
| WO | 02073523 | 9/2002 |
| WO | 02/101670 A2 | 12/2002 |
| WO | 03056403 A | 7/2003 |
| WO | 03056469 A | 7/2003 |
| WO | 2005045743 A | 5/2005 |
| WO | 2007/030544 A3 | 3/2007 |

OTHER PUBLICATIONS

European Search Report dated Feb. 6, 2006 mailed Feb. 20, 2006 for European Patent Application Serial. No. 10/985,173, 3 pages.
M. Karkkainen, et al.: "The product centric approach: a solution to supply network information management problems?" Computers in Industry, Elsevier Science Publishers. Amsterdam, NL, vol. 52, No. 2, Oct. 2003.
European Search Report dated Feb. 14, 2006 mailed Feb. 20, 2006 for European Patent Application Serial. No. 10/985,621, 3 pages.
International Search Report dated May 17, 2006 for International Patent Application Serial No. PCT/EP2005/007878, 8 pages.
International Search Report for PCT Application No. PCT/US06/34290, mailed Feb. 5, 2008, 2 pages.
OA Dated Aug. 8, 2008 for U.S. Appl. No. 11/241,421, 49 pages.
OA Dated Apr. 30, 2008 for U.S. Appl. No. 11/185,114, 80 pages.

OA Dated May 30, 2008 for U.S. Appl. No. 11/222,256, 60 pages.
OA Dated Apr. 28, 2008 for U.S. Appl. No. 11/220,130, 29 pages.
International Search Report for PCT Application Serial No. PCT/US06/34290, mailed Feb. 5, 2008, 2 pages.
OA Dated Aug. 28, 2008 for U.S. Appl. No. 11/129,199, 28 pages.
OA Dated Nov. 28, 2008 for U.S. Appl. No. 11/239,959, 75 pages.
OA Dated Jan. 12, 2009 for U.S. Appl. No. 11/184,233, 359 pages.
OA Dated Mar. 19, 2009 for U.S. Appl. No. 11/220,130, 18 pages.
OA Dated Nov. 24, 2008 for U.S. Appl. No. 11/220,130, 36 pages.
OA Dated Sep. 18, 2008 for U.S. Appl. No. 11/190,143, 22 pages.
OA Dated Mar. 26, 2009 for U.S. Appl. No. 11/200,915, 70 pages.
OA Dated Sep. 30, 2008 for U.S. Appl. No. 11/230,758, 63 pages.
OA Dated Feb. 6, 2009 for U.S. Appl. No. 11/241,421, 14 pages.
OA Dated Oct. 2, 2008 for U.S. Appl. No. 11/185,114, 42 pages.
International Search Report for PCT Application Serial No. PCT/US06/34721 mailed Apr. 26, 2007, 1 page.
OA Dated Apr. 16, 2009 for U.S. Appl. No. 11/230,758, 26 pages.
OA Dated Apr. 21, 2009 for U.S. Appl. No. 11/190,143, 19 pages.
CN OA Dispatched Jul. 4, 2008 for Chinese Application No. 200610141407.1, 12 pages.
EPOA dated Mar. 19, 2009 for European Patent Application No. 05 776 159.5, 3 pages.
EPOA dated Aug. 20, 2008 for European Patent Application No. 05 776 159.5, 3 pages.
International Search Report dated May 17, 2006 for PCT Application No. PCT/EP2005/007878, 8 pages.
OA dated Jun. 4, 2009 for U.S. Appl. No. 11/185,114, 95 pages
OA dated May 14, 2009 for U.S. Appl. No. 11/239,959, 37 pages.

* cited by examiner

RFID TAG PROGRAMMING, PRINTING APPLICATION, AND SUPPLY CHAIN/GLOBAL REGISTRATION ARCHITECTURE

CROSS-REFERENCE TO RELATED APPLICATIONS

This application is related to pending U.S. patent application Ser. No. 11/222,256 entitled "RFID ARCHITECTURE IN AN INDUSTRIAL CONTROLLER ENVIRONMENT" filed on Sep. 8, 2005, and pending U.S. patent application Ser. No. 11/200,915 entitled "ENHANCED CONTROLLER UTILIZING RFID TECHNOLOGY" filed on Aug. 10, 2005.

TECHNICAL FIELD

The subject invention relates to industrial control systems and, more particularly, to systems and methods that employ radio frequency identification (RFID) technology in connection with manufactured goods.

BACKGROUND OF THE INVENTION

Industrial controllers are special purpose processing devices used for controlling (e.g., automated and semi-automated) industrial processes, machines, manufacturing equipment, plants, and the like. A controller executes a control program or routine in order to measure one or more process variables or inputs representative of the status of a controlled process and/or effectuate outputs associated with control of the process. Such inputs and outputs can be digital and/or analog, assuming a continuous range of values. A control routine can be created in a controller configuration environment that has various tools and interfaces whereby a developer can construct and implement a control strategy using industrial and conventional programming languages or graphical representations of control functionality. Such control routine can be downloaded from the configuration system into one or more controllers for implementation of the control strategy in controlling a process or machine.

Measured inputs received from a controlled process and outputs transmitted to the process can pass through one or more input/output (I/O) modules in a control system. Such modules can serve in the capacity of an electrical interface between the controller and the controlled process, and can be located local or remote from the controller. Inputs and outputs can be recorded in an I/O memory. The input values can be asynchronously or synchronously read from the controlled process by one or more input modules and output values can be written directly to memory by a processor for subsequent communication to the process by specialized communications circuitry. An output module can interface directly with a controlled process by providing an output from memory to an actuator such as a motor, drive, valve, solenoid, and the like.

During execution of the control routine, values of the inputs and outputs exchanged with the controlled process can pass through memory. The values of inputs in memory can be asynchronously or synchronously updated from the controlled process by dedicated and/or common scanning circuitry. Such scanning circuitry can communicate with input and/or output modules over a bus on a backplane or network. The scanning circuitry can also asynchronously or synchronously write values of the outputs in memory to the controlled process. The output values from the memory can be communicated to one or more output modules for interfacing with the process. Thus, a controller processor can simply access the memory rather than needing to communicate directly with the controlled process.

In distributed control systems, controller hardware configuration can be facilitated by separating the industrial controller into a number of control elements, each of which performs a different function. Particular control modules needed for the control task can then be connected together on a common backplane within a rack and/or through a network or other communications medium. The control modules can include processors, power supplies, network communication modules, and I/O modules exchanging input and output signals directly with the controlled process. Data can be exchanged between modules using a backplane communications bus, which can be serial or parallel, or via a network. In addition to performing I/O operations based solely on network communications, smart modules exist which can execute autonomous logical or other control programs or routines. Various control modules of a distributed industrial control system can be spatially distributed along a common communication link in several locations. Certain I/O modules can thus be located proximate to a portion of the controlled equipment, and away from the controller. Data can be communicated with these remote modules over a common communication link, or network, wherein all modules on the network communicate via standard communication protocols.

In a conventional distributed control system, one or more I/O modules are provided for interfacing with a process. The outputs derive control or output values in the form of a message from a master or peer device over a network or a backplane. For example, an output module can receive an output value from a processor via a communications network or a backplane communications bus. The desired output value is generally sent to the output module in a message. The output module receiving such a message will provide a corresponding output (analog or digital) to the controlled process. Input modules measure a value of a process variable and report the input values to another device over a network or backplane. The input values can be used by a processor for performing control computations.

As noted above, industrial controllers can be utilized to control systems, machines, processes, etc., in the industrial automation and manufacturing environment. An evolving technology that is gaining more and more interest in this environment is Radio Frequency Identification (RFID), which leverages electronic data to mitigate data from reading (e.g., scanning bar codes) and/or opening containers to obtain product information. Suitable electronic product data can include electronic product code (EPC) data as well as other product-related data. A typical EPC is a unique number bit-encoded and embedded in an RFID tag (a small silicon chip with one or more antennas) affixed to an associated product. An RFID reader is a device that can be utilized to read and/or write RFID tag data, depending on read/write privileges. For example, an RFID reader can be utilized to read EPC and/or electronic data from an RFID tag via wireless (e.g., radio frequency (RF)) communication and/or write EPC and/or electronic data to an RFID tag.

Electronic product data read from an RFID tag can be utilized to provide a greater degree of certainty over what goes into a supply chain and/or how to manage raw materials, warehouse inventory, shipments, logistics, and/or various other aspects of manufacturing. However, conventional systems that employ RFID technology generally convey electronic product data obtained by RFID readers from RFID tags to a PC-based server that performs data filtering and management, and provides interfaces to other industrial applications. Thus, there is an unmet need to provide improved RFID technology mechanisms with industrial controllers.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Its sole purpose is to present some concepts of the invention in a simplified form as a prelude to the more detailed description that is presented later.

The systems and methods of the subject invention relate to novel techniques that integrate Radio Frequency Identification (RFID) technology with industrial controllers. The systems and methods herein provide for printing RFID tags based on RFID tag information that has been generated or received by an industrial controller. The industrial controller can operate within in an industrial environment, and can be part of an industrial and/or manufacturing network. Middleware software, as part of the industrial controller, can be managed by the industrial controller to organize and schedule the RFID tag information in a manner compatible with an RFID tag printer. Such organization can include creating and/or publishing reliable messages in XML (eXtensible Markup Language) and based on the RFID tag information, and/or arranging the RFID tag information in printing queues based on one or more topics, for example. RFID tag printing occurs in conjunction with one or more industrial processes, as the industrial controller allows for a seamless integration of RFID tag printing in the industrial environment.

In another aspect thereof, the industrial controller can further manage one or more RFID tag related processes such as RFID tag affixation, RFID tag programming, and/or a RFID tag quality verification procedure, for example.

In yet another aspect of the subject invention, the industrial controller can update a global registry with RFID tag information (e.g., RFID tag ID) associated with printed RFID tags. The registry update procedure can be facilitated by creating email messages related to the RFID tags that have been created, for example.

In still another embodiment, the subject invention facilitates distribution of electronic product data such as EPC data to a PLC (Programmable Logic Controller), controllers, modules, and/or control applications, for example. The systems and methods integrate RFID technology with such industrial components and/or processes. Electronic data residing in RFID tags can be received through RFID reader interfaces employing various vendor specific plug-ins, and electronic data residing in a server can be received through server interfaces. Received electronic product data can be filtered, processed, and stored, for example, as records in a table. Stored data can be provided to one or more controllers, modules, control applications, for example, upon receiving a subscription and/or request for such data.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
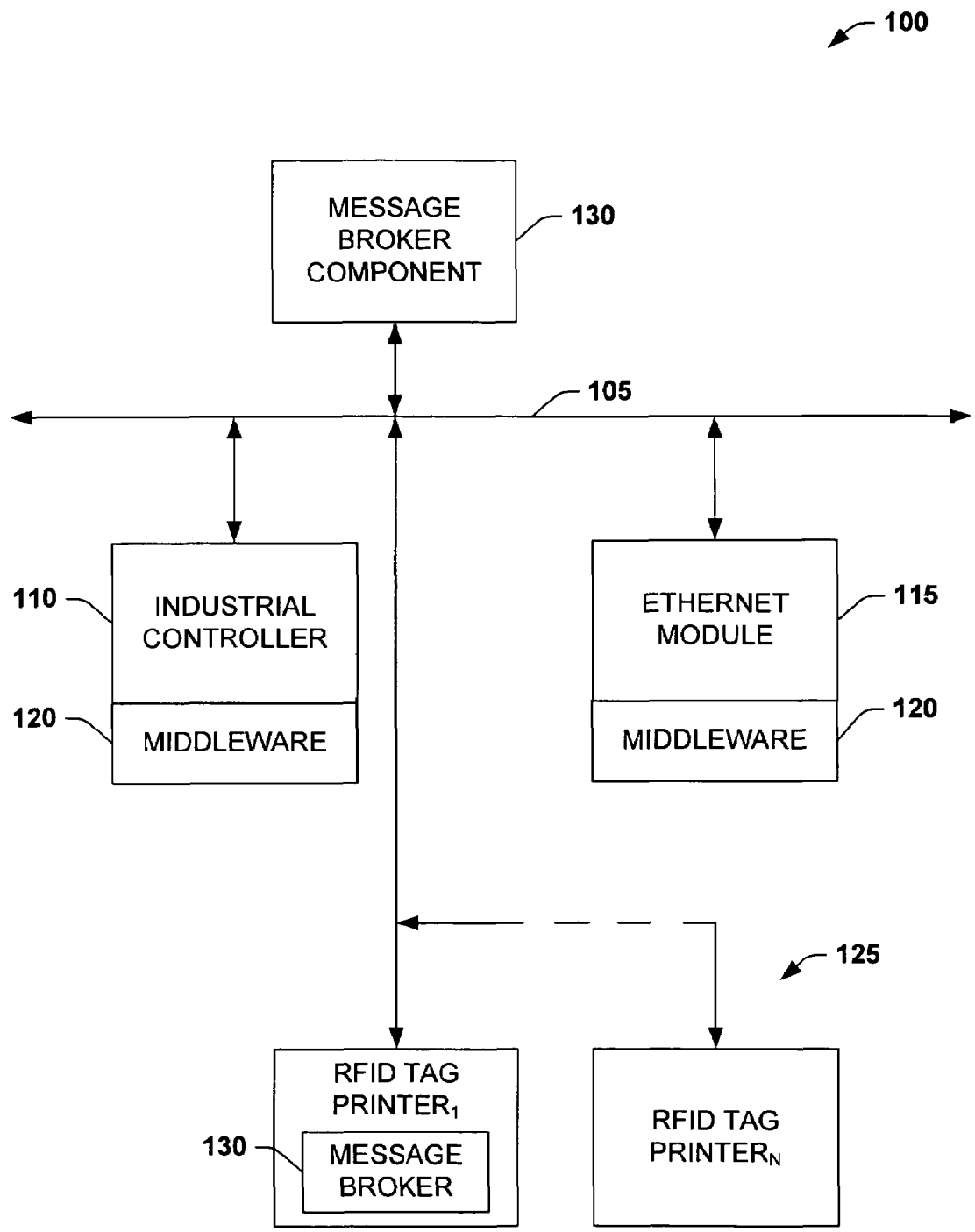
FIG. 1 illustrates an exemplary system that facilitates RFID tag printing within an industrial environment.

As utilized in this application, terms "component," "object," "module," "system," "controller," "device," "interface," "middleware" and variants thereof are intended to refer to a computer-related entities, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. Additionally, it is noted that printing of a Radio Frequency Identification (RFID) tag and programming of an RFID tag can be understood as identical processes or separate processes directed to the creation, assembly, encoding, and/or production of one or more RFID tags.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

FIG. 1 illustrates an exemplary system 100 that facilitates RFID tag printing within an industrial environment. The system 100 includes, but is not limited to, a system bus 105, an industrial controller 110, and an Ethernet module 115. Both the industrial controller 110 and the Ethernet module 115 can run middleware 120. In addition, the system 100 includes one or more RFID tag printers 125 that can print one or more unique RFID tags. The industrial controller 110 and/or Ethernet module 115 can be operative within an industrial environment such as a production line, a manufacturing location, and/or a product distribution center, for example. The industrial controller 110 and/or Ethernet module 115 can be coupled to one more other industrial controllers related to other industrial processes. In this embodiment, the industrial controller 110 can be a programmable logic controller that receives RFID tag information over the Ethernet connection.

The industrial controller 110 and/or Ethernet module 115 comprise middleware 120 that at least manages the exchange of the RFID tag information with the RFID tag printers 125 in conjunction with one or more manufacturing processes. For instance, the middleware 120 can capture RFID tag information and publish a message to one or more of the RFID tag printers 125 regarding one or more unique RFID tags to be printed. Such message publication provides for the creation of reliable messages in XML (eXtensible Markup Language), and/or creating messages queues. Furthermore, the middleware 120 publishes the messages via a protocol that is compatible with the design and/or configuration of the RFID tag printers 125. As an example, one or more of the RFID tag printers 125 can comprise a subscription module that accesses the published messages as part of a broader RFID tag printing program. The middleware 120 of the industrial controller 110 can sense the subscription requirements and adapt publication procedures as the RFID tag printers 125 configuration and/or subscription module is modified. Additional aspects of the subject invention are further described below.

The system 100 can facilitate electronic data exchange within an industrial environment. The industrial controller 110 and/or Ethernet module 115 can exchange electronic data with entities within the industrial environment in order to store and/or convey electronic data. For example, the industrial controller 110 and/or Ethernet module 115 can include and/or be coupled to a processing module in order to exchange electronic data (e.g., RFID tag information) with various readers, writers, servers, storage components, etc. Such data can include unprocessed (e.g., raw data) and/or processed (e.g., filtered and formatted) electronic data. In addition, suitable electronic data can be compressed, encrypted, encoded, modulated within a carrier envelope, protected (e.g., password), etc., and conveyed as a data stream, one or more data bursts and/or one or more data packets, for example.

In one instance, the electronic data can be electronic product data (e.g., EPC-Electronic Product Code data) and other data associated with the product and/or manufactured good). Such data can be obtained from a RFID tag affixed to the product and read by devices such as RFID readers and/or stored in related servers. The communications channel between the processing module and these devices can be through essentially any wire and/or wireless channel, including Ethernet (e.g., 10BASE-T, 100BASE-T and 1000BASE-T), serial port (e.g., RS-232 and RS-485), parallel port, coaxial cable, Infrared (IR), BlueTooth, Universal Serial Bus (USB), Firewire, powerline communications such as HomePlug, ZigBee IEEE 802.15, WiFi IEEE 802.11, WiMax IEEE 802.16, and the like. In addition, the processing module can employ various interfaces to receive data from different sources (e.g., different device models, manufacturers, vendors, and software revisions).

The processing module can receive pushed and/or pulled data. In one example, a reader can periodically transmit or emit electronic data to the processing module, which can accept or reject the electronic data, for example, based on whether the electronic data is data of interest to the industrial environment. Such data discrimination can be facilitated by filters or other software and/or hardware that pass and/or reject data. Alternatively and/or additionally, intelligence can be utilized to facilitate selection of suitable electronic data. In this instance, the intelligence can employ machine learning techniques that utilize statistics, probabilities, inferences, classifiers, etc., to render a decision as to whether electronic data should be accepted. In another example, the processing module can transmit a message that indicates it is ready to receive electronic data. In yet another example, the processing module can query electronic data, for example, from one or more other components, servers and/or databases. It is to be understood that the RFID middleware and/or the industrial controller 102 can execute similar procedures as the processing module in regards to handling the electronic product data in order to expedite RFID tag printing.

A further example leverages reliable messaging to show the information exchange between one or more of the RFID printers 125 and the industrial controller component 110. In this example, the printers 125 can subscribe to a reliable messaging queue, such as a MQTT (message queue telemetry transport) broker topic, depicted as a message broker component 130. In one implementation, the message broker component 130, for example purposes, can be employed in the middleware component 120. In another embodiment, the broker component 130 can be employed as a separate node on the network 105, and/or can also be contained in one or more of the printers 125, for example, a first tag printer, denoted RFID TAG PRINTER$_1$. The industrial controller 110 can publish a message to the topic to which the printer is subscribed. Each time the PLC publishes a message, the RFID printer prints the tag with information contained in the MQTT message. This example can be extended where the printer or another RFID reader may read back in the newly minted or applied tag and send a confirmation message to the broker, to which the PLC subscribes, and provide the PLC with an acknowledgement that the tag was programmed, applied and successfully read before leaving the work area. This message broker may also operate coupled with an upper layer system performing tag filtering such as the IBM Premises Server through the MQTT queues, for example.

The processing module can operate on received electronic data. For example, the processing module can filter, parse, and/or format electronic data. In addition, the processing module can selectively extract and/or discard portions of the electronic data. Where the data is compressed, encrypted, encoded, modulated, protected, etc., the industrial controller 110 and/or Ethernet module 115 can act on the electronic product data in this state and/or decompress, decrypt, decode, demodulate, unprotect, etc., the data prior to acting on it. In addition, the industrial controller 110 and/or Ethernet module 115 can store the electronic data, for example, within local and/or remote storage components. For example, the processing module can include various volatile and/or non-volatile memory that can be utilized to store the electronic data. Alternatively and/or additionally such memory can reside remote from the processing module, such as within the industrial controller 110 and/or Ethernet module 115. Additionally, such memory can reside in other modules controlled and/or managed by the industrial controller 110 and/or Ethernet module 115.

It is to be appreciated that the electronic data can be stored. For example, the data can be stored in records of a database, one or more binary files, and one or more ASCII (American Standard Code for Information Interchange) files. Stored electronic data can be conveyed to an industrial control 110 and/or Ethernet module 115 interface, which can provide communication interfaces to convey at least a portion of the electronic data to one or more entities within the industrial environment (e.g., RFID tag printers). Such interfaces can include essentially any interface, including publish/subscribe and query based interfaces that enable an entity to subscribe to receive electronic product data and/or a signal quality indicator when such data becomes available and/or query saved electronic data.

It is to be appreciated that the system 100 can be integrated within one or more control systems. In one instance, the system 100 can reside and execute within an entity of a control system. In another instance, the system 100 can be an additional component that facilitates electronic data exchange as described herein. It is noted that any interface employed by the industrial controller 110 and/or Ethernet module 115 can be software and/or hardware based. For example, these components can be implemented in essentially any programming language, such as, for example, LISP, C, C++, C# or Java based languages. In addition, a markup language such as XML and/or Physical Markup Language (PML) can be utilized to define a system configuration, and/or create reliable messages based on RFID tag information, which can include information on mapping between logical-physical readers, available filters, etc. Additional aspects of the subject invention are further described below. It is understood that such further discussion can include and/or incorporate fully and/or partially, aspects described as to FIG. 1.

Figure 2:
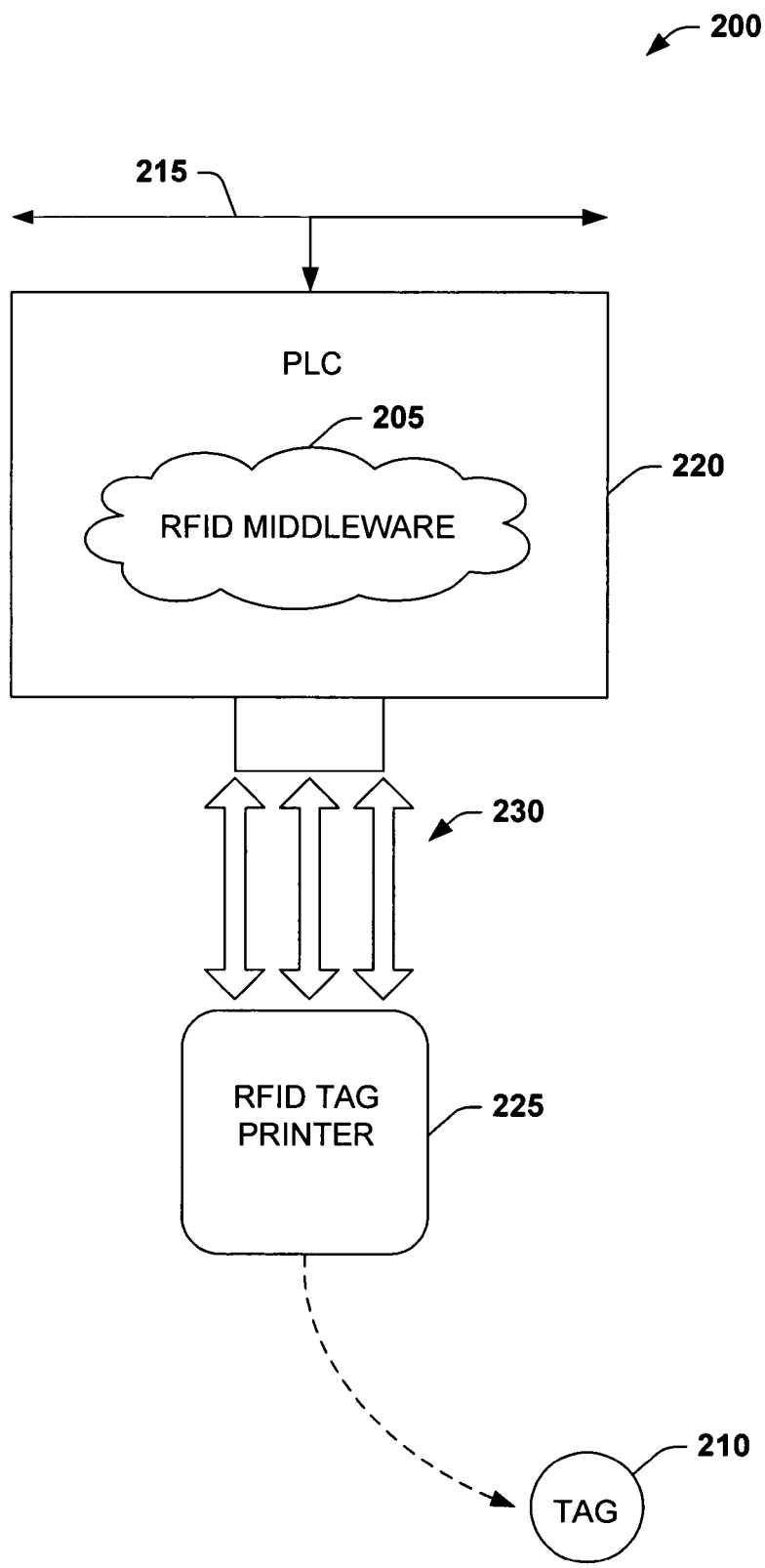
FIG. 2 illustrates an exemplary system that employs middleware in order to print one or more RFID tags.

FIG. 2 illustrates an exemplary system 200 that utilizes middleware 205 in order to print one or more RFID tags 210. The system 200 includes a network 215 (e.g., Ethernet), a PLC 220 that runs the middleware 205, and an RFID tag printer 225 that prints the one or more unique RFID tags 210. The middleware 205 can be a layer of software between the PLC 220 and the tag printer 225. Such a layer of software provides services such as identification, authentication, authorization, directories, security, and RFID tag information organization, for example. In that sense, the middleware 205 can act as an interface between the PLC 220 and the tag printer 225. However, it is noted that the middleware 205 can be stored and executed in the PLC 220. The PLC 220 can also receive RFID tag information over the network 215. Further, the PLC 220 can publish the RFID tag information into one or more reliable message queues and/or topics 230. Hence, the PLC 220 can act as a reliable message hub as it receives the RFID tag information and runs the middleware 205. The tag printer 225 can subscribe to such queues and/or topics 230 in order to retrieve information to print the one or more unique RFID tags 210. Additionally, it is to be appreciated that the subject invention is not limited to employing the PLC 220. Any exemplary implementation can employ an industrial module that executes a control function throughout the system 200. The industrial module can include a PLC, an input/output component, a network interface component, a human machine interface (HMI) component, or functional combinations thereof.

Figure 3:
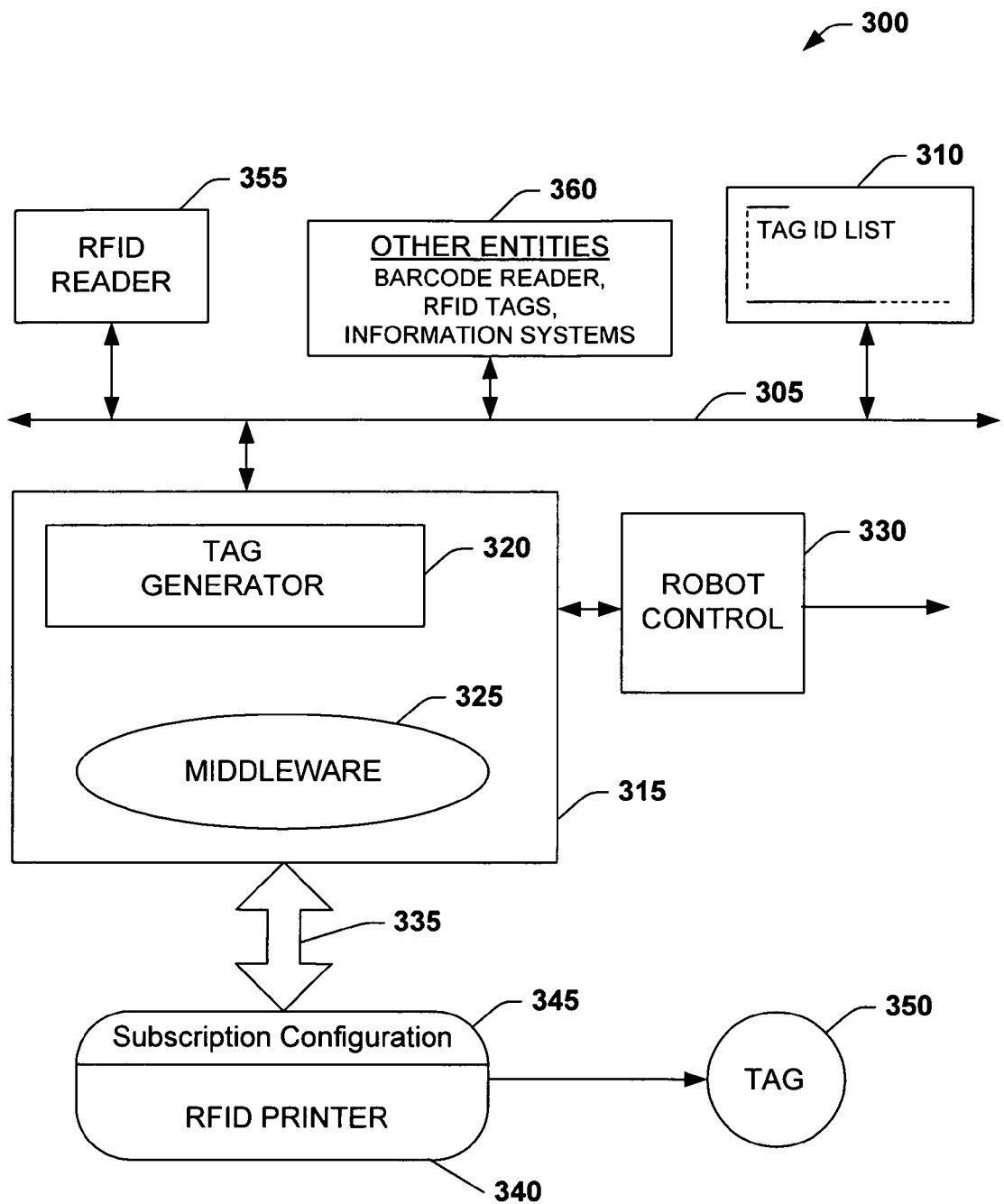
FIG. 3 illustrates an exemplary system for RFID tag printing and RFID tag affixation.

FIG. 3 illustrates an exemplary system 300 for RFID tag printing and RFID tag affixation. The system 300 includes a system bus 305, RFID tag information 310, and an industrial module 315 that can run a tag generator 320, middleware 325, and a RFID tag affixation module 330. The tag generator 320, middleware 325, and the RFID tag affixation module 330 can execute respective functions in coordination with each other as well as share, create, and/or update data individually and in conjunction with each other. An RFID tag printer 340 is further included in the system 300. The RFID tag printer 340 can also include subscription configuration data 345 that allows the RFID tag printer to access RFID tag information 310 from the industrial module 315. The industrial module 315 can receive such RFID tag information 310 via the system bus 305. Alternatively, the industrial module 315 itself can generate the RFID tag information via the tag generator 320. The RFID tag information 310 can be received over the bus 305 and can also be combined with and/or enhanced by information generated by the tag generator 320 or by other components, such as from an additional RFID reader 355, and other entities 360 (e.g., PLC data tags, a bar code reader, and/or information systems). The additional RFID reader 355 in this example can supply information about the lot or batch of raw material used to manufacture the new aggregate product to the PLC for incorporation into the subject tag programming. Further, this information can flow through an upper level system that records the association, and optionally supplies the PLC with a derivative information set to program. Additionally, the RFID tag affixation module 330 can, for example, facilitate control of a robotic arm or roller that affixes one or more printed RFID tags onto one or more manufactured goods.

The industrial module 315 can be an industrial controller, a PLC, or the like. As such, the industrial module 315 can comprise one or more modules such as a processing module, a memory module, and an I/O module, and a power component to energize components therein. The processing module can be utilized to execute control applications, end-user programs and associated instructions, which can be stored within the memory module or memory external to the industrial module 315. The I/O module provides communication with the environment. For example, an input channel can be employed to receive analog and digital signals through sensors, switches and the like to provide information indicative of state and/or relating to a process, whereas an output channel can be utilized to convey a next state to an entity under the control of the controller.

The RFID tag printer 340 can utilize the subscription configuration 345 to access the RFID tag information, however formatted, organized and/or scheduled 335, to print and program one or more unique RFID tags 350. The RFID tag printer 340 can also create and/or store time stamps as to when one or more unique RFID tags 350 were actually printed, and can also print duplicate RFID tags, as necessary.

The RFID tag information 310 can include a variety of information to enable accurate and manageable RFID tag printing and/or RFID tag programming. For example, the RFID tag information received and/or generated can include, RFID tag serial numbers, tag identification numbers, priority codes, formatting instructions, message publication instructions, tag programming instructions, product specific information, logistics information, product cost information, supply chain data, global registry information, and codes that can interact and/or adapt to the subscription configuration of the RFID tag printer 340. RFID tag information can also include visual information and graphics to print on the tag carrier label, in addition to the programming of the tag itself. This can include bar codes, colors, graphics, and duplicates of the information programmed into the tag. The information on the label can be both plain text, as well as encoded data, using encryption schemes that can include cipher text which is alphanumeric as well as graphical and non-alphanumeric encoding.

The RFID tag affixation module 330, managed by the industrial module 315, can oversee affixing the RFID tag upon one or more manufactured goods. It is noted that such tag adhesion can also occur upon a package in which one or more manufactured goods are enclosed. Further, the RFID tag affixation module 330 is not limited to affixing only one RFID tag per package and/or manufactured good, but can apply multiple tags, where desired.

Figure 4:
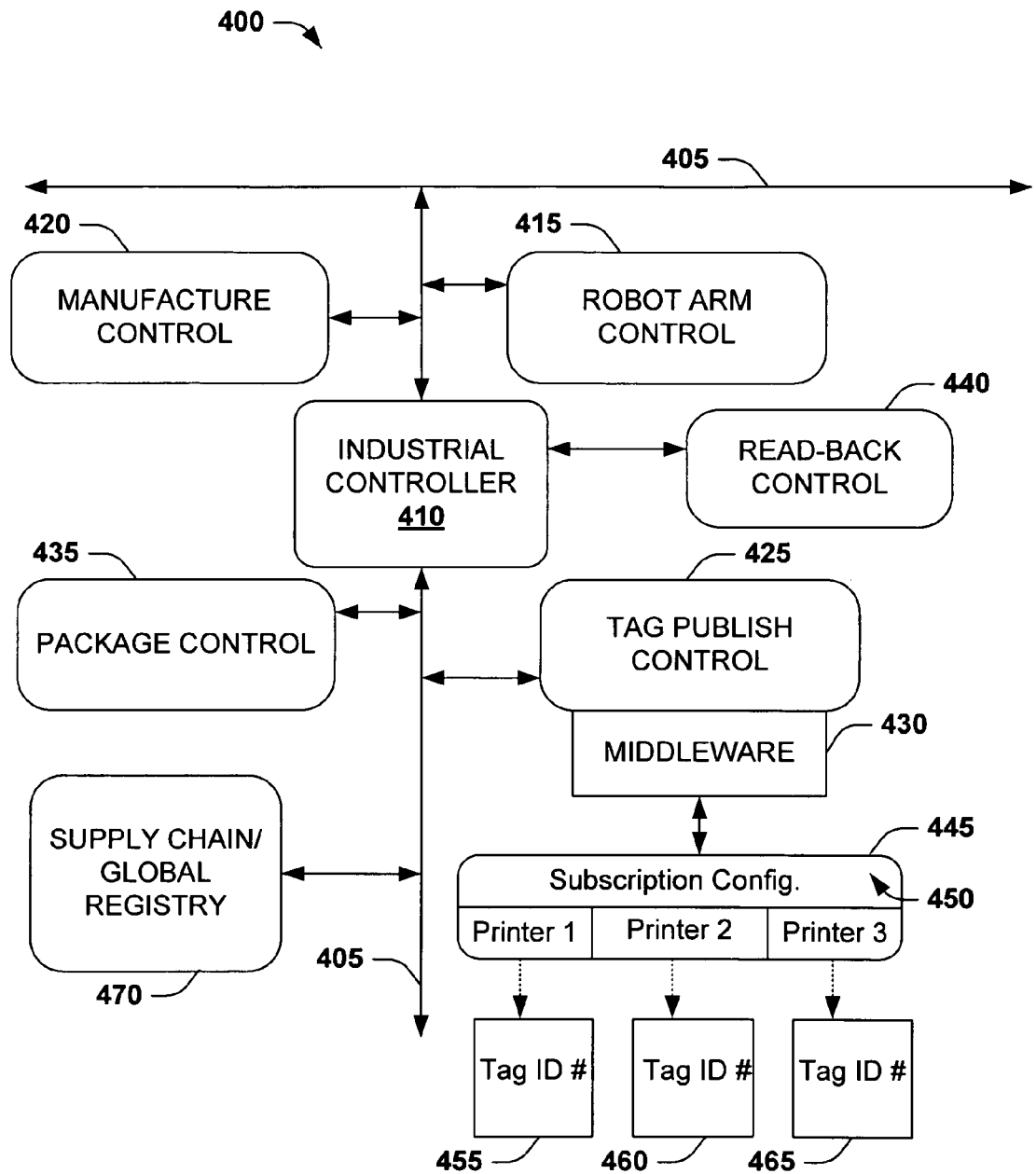
FIG. 4 illustrates an exemplary system that integrates RFID tag printing with a plurality of industrial processes.

FIG. 4 illustrates an exemplary system 400 that integrates RFID tag printing with a plurality of industrial processes. The system 400 provides for an industrial bus 405, an industrial controller 410 that can include and/or manage a robot arm control module 415, a manufacture control module 420, a tag publish control module 425 that executes a middleware 430, a package control module 435, and a verification read back control module 440. The tag publish control module 425 can execute RFID middleware 430 that interacts with an RFID tag printer and/or a cluster of the RFID tag printers 445. The industrial controller 410 can also update a UCC (Uniform Code Council) supply chain global registry 470 with information related to the one or more manufacturing processes and/or data related to RFID tag printing, and data encoded in one or more printed RFID tags 455, 460, 465. It is to be appreciated that the RFID tags 455, 460, 465 can all be unique; however, this is not required.

The manufacture control module 420 can run and/or regulate one or more manufacturing and/or production processes to produce at least one manufactured item. The package control module 435 can place one or more manufactured items in a distinct package, and can also arrange a plurality of distinct packages into package sets intended to facilitate product sale and/or transportation. The tag publish control module 425 can format and schedule RFID tag information that has been received by the industrial controller 410 via the bus 405 and/or a network related to the industrial environment. The industrial controller 410 can also generate the RFID tag information. RFID tag information scheduling and formatting can be facilitated and processed through RFID middleware 430 residing in the tag publish control module 425 of the industrial controller 410. The tag publish control module 425 publishes messages, based on the RFID tag information, to the RFID tag printer cluster 445.

The RFID tag printer(s) 445 includes subscription configuration data 450 to access the published messages. The printer(s) 445 can then print and program one or more unique RFID tags 455, 460, 465. Such programming can include encoding the printed unique RFID tags with information that is specific to the tag itself and related to the item and/or distinct package upon which the unique RFID tag will be placed. RFID tag application can occur via the robot arm control module 415 operating a robotic arm to place at least one printed and programmed RFID tag on the proper manufactured item, distinct package, and/or package set.

The read back verification control module 440 can scan one or more affixed RFID tags to determine whether the RFID tags are operative, and/or whether the encoded information is correct. If an inoperative RFID tag(s), and/or an improperly encoded RFID tag(s) are detected, the industrial controller 410 can initiate the entire RFID tag information generation and/or retrieval process in order to reprint the RFID tag(s) found to be problematic.

Information related to operative RFID tags can be sent to the supply chain global registry 470. Such information can include tag ID numbers, the information encoded in each unique RFID tag, and data related to the transport of the one or more manufactured items and/or one or more distinct packages containing one or more RFID tags.

FIGS. 5-8 illustrate methodologies, in accordance with an aspect of the subject invention. While, for purposes of simplicity of explanation, the methodologies are shown and described as a series of acts, it is to be understood and appreciated that the subject invention is not limited by the order of acts, as some acts can, in accordance with the subject invention, occur in different orders and/or concurrently with other acts from that shown and described herein. For example, those skilled in the art will understand and appreciate that one or more of the methodologies could alternatively be represented as a series of interrelated states or events, such as in a state diagram. Moreover, not all illustrated acts may be required to implement the methodologies in accordance with the subject invention.

Figure 5:
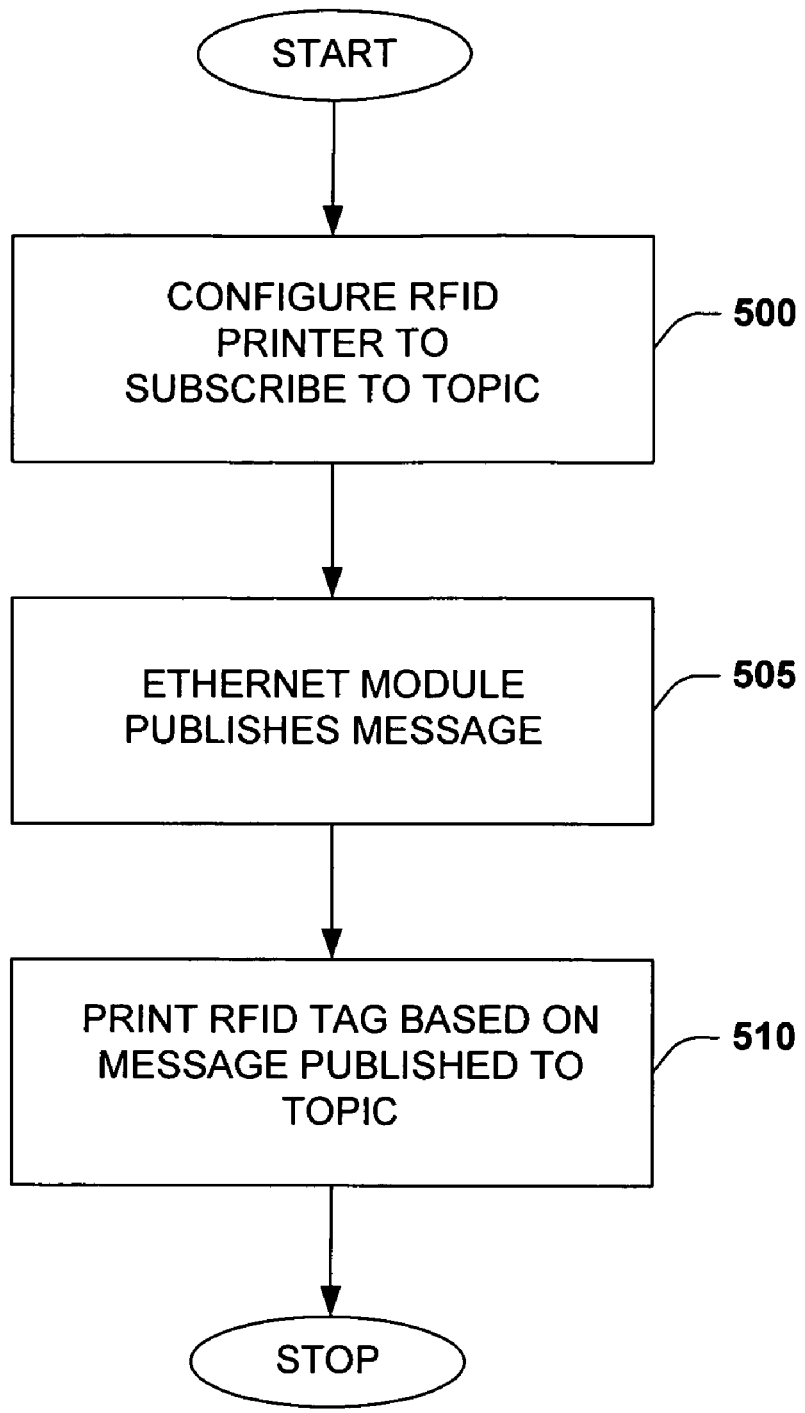
FIG. 5 illustrates an exemplary method for printing RFID tags based on published electronic product data received from an Ethernet module.

FIG. 5 illustrates an exemplary method for printing RFID tags based on published electronic product data received from an Ethernet module. At 500, one or more RFID tag printers can be designed and/or configured to receive formatted and/or scheduled electronic product data from an Ethernet module. Such configuration can be adaptable throughout a manufacturing process by employing artificial intelligence that can use data relating to production line statistics and/or real-time production data provided by the Ethernet module and/or industrial controllers involved throughout the production line. As an example, an RFID printer can execute a subscription process in which it seeks to access electronic product data related to a topic. The topic, for instance, can be related to a particular type of manufactured item(s), product, and/or can be a bit tag added to the electronic product data as a result of a formatting protocol intended to better organize the data. Further the printer may discover the information through such means as a Domain Name Service (DNS) or DDNS (dynamic DNS), or directory like LDAP (Lightweight Directory Access Protocol) or Microsoft Active Directory, web service based such as UDDI (universal description, discovery and integration) lookup or simply manually configured.

At 505, the Ethernet module can publish electronic product data by one or more topics. Such publication can include creating one or more reliable XML messages based on the electronic product data under one or more topics compatible with the design, configuration, and/or the subscription process of the RFID printer. Each reliable XML message can include electronic product data that is relevant to one or more unique RFID tags that need to be printed and eventually affixed to a particular manufactured good(s). For instance, the electronic product data can comprise indications describing characteristics of the manufactured good(s), characteristics of the product type(s), as well as data that is intended to facilitate the management and execution of actual RFID tag printing that can occur at 510.

It is understood that after printing one or more unique RFID tags, the electronic product data from the one or more reliable XML messages can be erased, stored, or sent to other various components of the production line and/or industrial environment. Such electronic product data handling includes formatting the electronic data for subsequent storage, recognizing electronic product data of interest, etc. In one instance, the electronic data can be stored as records in a table, wherein individual rows are utilized to delineate related electronic data across fields, or columns. In one particular example, individual fields can store an EPC code, a logical reader identifier, a timestamp, a flag that indicates a logistical path of a RFID tag, etc. Such information can be later compiled for a supply chain registry update procedure. Additionally, the electronic data can filtered before and/or after RFID tag printing. Such filtering includes recognizing and filtering duplicate readings. The filtering can recognize differing electronic data formatted in a reliable XML message and consider the printing of different unique RFID tags.

Figure 6:
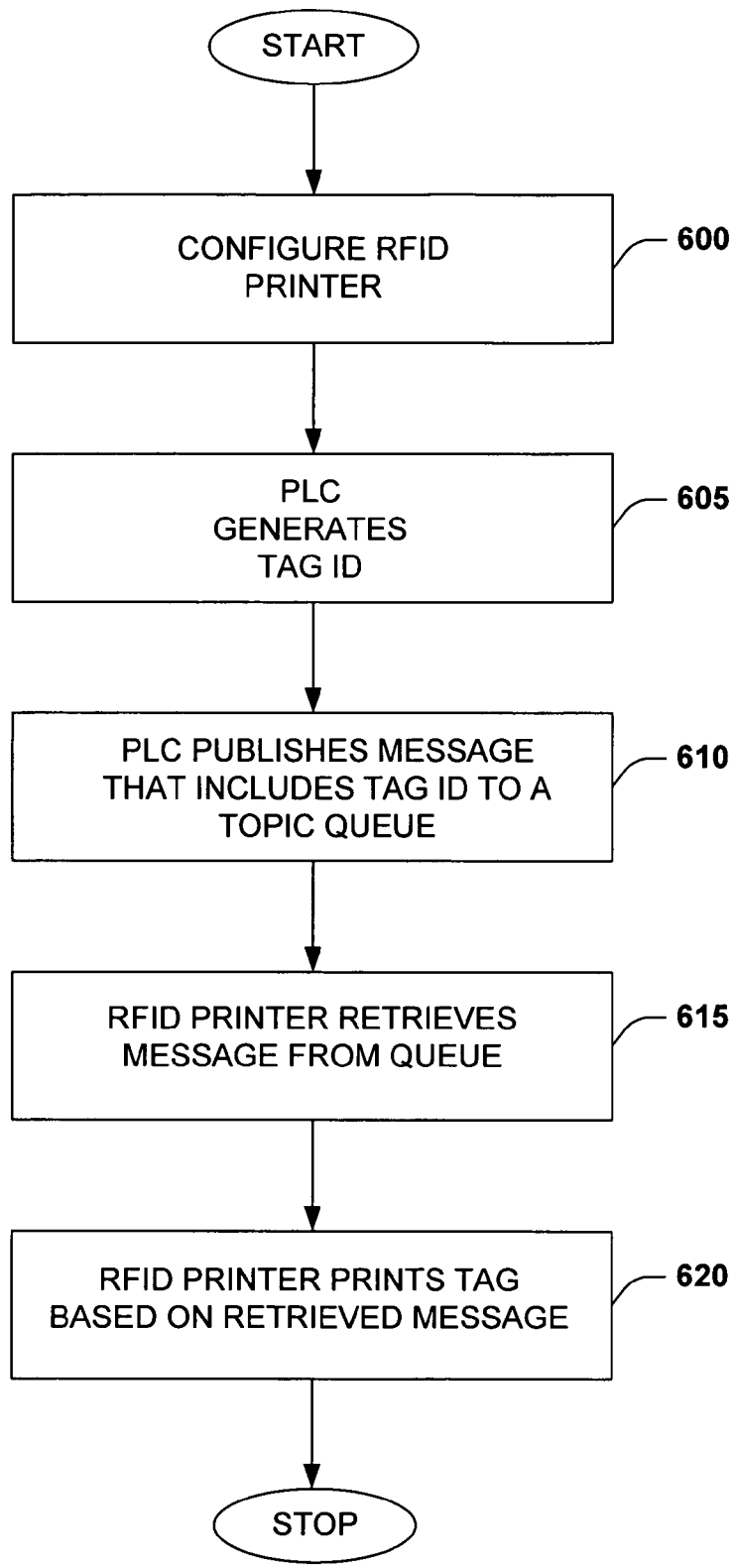
FIG. 6 illustrates an exemplary method for printing RFID tags based on published messages from RFID tag information generated by a programmable logic controller.

FIG. 6 illustrates an exemplary method for printing RFID tags based on published messages from RFID tag information generated by a PLC. At 600, an RFID tag printer can be coupled to a PLC and be configured to exchange information with the PLC. The RFID tag printer can be, for example, manufactured by Zebra. Printer configuration data that enables information exchange can be inherent in the design of the RFID tag printer, and/or be a software-based solution. At 605, the PLC can generate one or more tag ID numbers and/or RFID tag information. The RFID tag information can be related to and/or similar to EPC numbers. Regarding such EPC numbers, four exemplary key elements are further described. First, an EPC number can include a header, which identifies the length of the EPC number, including the number, type and version. Second, an EPC manager which identifies the company and/or entity responsible for managing the next two EPC elements. Third, an object class which identifies the item. Fourth, a serial number, which identifies a unique serial number for all items in a given object class.

At 610, the PLC can publish one or more reliable messages and/or send printing instructions to a queue and/or a message topic list. It is understood that the PLC can organize and/or schedule the RFID tag information via various protocols and/or algorithms. At 615, the RFID tag printer can access the RFID tag information from the queue and/or message topic list. The printer can access the tag information while the PLC is generating and/or publishing more tag information. Further, the PLC and the tag printer can modify organization and/or scheduling protocols dynamically. At 620, the RFID tag printer prints one or more unique RFID tags based on accessed RFID tag information.

It is to be appreciated that each printed unique RFID tag can comprise, for example, one or more silicon chips containing data about the object to which the tag is attached, data of an antenna that transmits and/or reflects to an RFID reader radio waves containing data about the object the to which the tag can be attached, and an enclosure that embodies the complete package of silicon chip, antenna (with printed circuit board), and protective casing (such as a label), which is applied later to an object.

Figure 7:
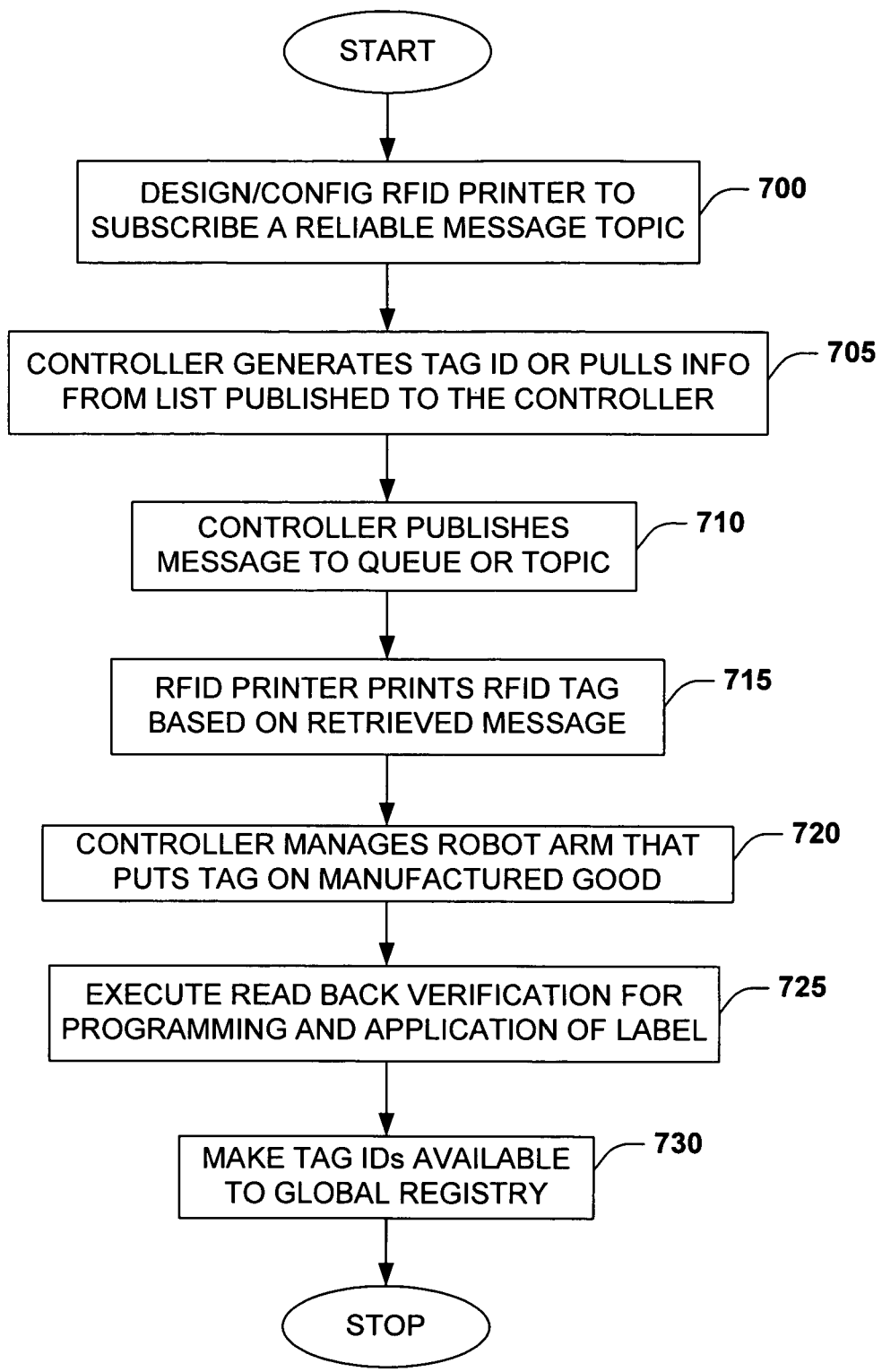
FIG. 7 illustrates an exemplary method for updating a global registry with RFID tag data encoded in printed RFID tags.

FIG. 7 illustrates an exemplary method for updating a global registry with RFID tag data encoded in printed RFID tags. At 700, one or more RFID tag printers can be designed and/or configured to print one or more unique RFID tags in an industrial environment. An industrial environment can be, for example, a distribution center, a manufacturing location, a production line, and/or a warehouse. Multiple RFID tag printers can be arranged in a cluster, that is, they can be coupled together to alternate RFID tag printing, print in conjunction with other RFID tag printers, and/or print tags in predetermined cycles.

At 705, an industrial controller, coupled to one or more RFID tag printers, can generate RFID tag data (e.g., tag IDs). The industrial controller can also be operative to pull a RFID tag data list from a network and/or another module such as a server, data storage unit, or a memory associated with the industrial environment, for example. The RFID tag data is further processed by the industrial controller in order to organize the RFID tag data for interaction with one or more RFID tag printers. For example, the industrial controller can execute middleware that filters and/or formats the RFID tag data into messages that one or more RFID tag printers can access and process to facilitate tag printing.

At 710, the industrial controller can publish and/or send the messages through an information channel to the one or more RFID tag printers. The communication protocol of the information channel can be compatible with the configuration and/or design of the RFID tag printer(s), and/or the RFID tag printer(s) can employ a subscription component to enable interaction with the information channel. For instance, the industrial controller can publish messages through the information channel by topic and/or in or more queues. The subscription component of one or more RFID tag printers can sense the organization and/or formatting of the published messages and can access the messages accordingly.

At 715, the one or more RFID tag printers can print and program one or more unique RFID tags based on the RFID tag data provided in the published messages sent through the information channel. The tag printing can occur in conjunction with one or more industrial processes related to the industrial environment. At 720, the industrial controller can directly and/or indirectly manage a procedure that utilizes a robotic arm to affix the printed RFID tags onto one or more manufactured goods. The manufactured goods can be in packaging as well, for example. The robotic arm can affix one or more RFID tags upon one or more manufactured goods and/or one or more distinct packages. It is to be appreciated that multiple robotic arms can also be controlled by the industrial controller to affix the RFID tags.

At 725, the industrial controller, and/or another module related to the industrial environment, can directly and/or indirectly manage a read-back verification procedure in order to verify proper RFID tag printing and/or programming. The read-back verification procedure can be executed before, during, and/or after affixation. RFID tags, and the one or more respective manufactured goods upon which the tags are affixed, can be routed through a procedure where the inoperative tags and the one or more goods can be separated and the tags can be destroyed, modified, and/or reprinted.

At 730, data related to printed RFID tags and/or affixed RFID tags that have been verified as valid, and/or RFID tags that have been destroyed and/or reprinted can be sent over a network to a global supply chain registry. The data can include RFID tag identification numbers, the data encoded in each tag, and data associated with the printing of the RFID tags. Data relating to destroyed tags can be utilized to determine tag printing efficiency and/or affixation efficiency.

Figure 8:
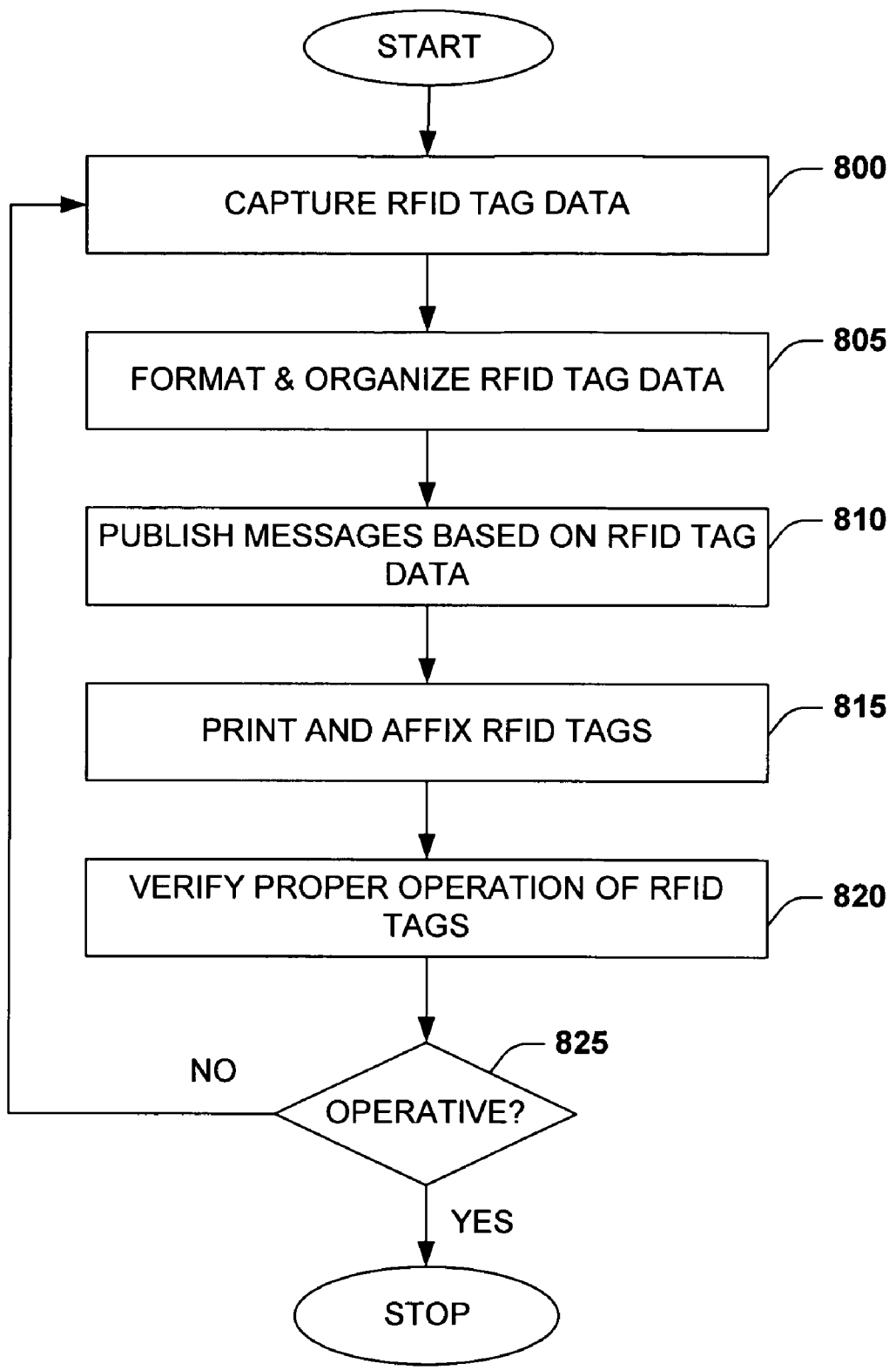
FIG. 8 illustrates an exemplary method for verifying proper operation of printed RFID tags.

FIG. 8 illustrates an exemplary method for verifying proper operation of printed RFID tags. At 800, RFID tag data can be captured by an industrial module and/or an Ethernet module. Such RFID tag data can be transmitted to a module over a wireless network, for example, which can be part of a greater industrial environment in a distribution center and/or a production line. The RFID tag data may also contain information relevant to other aspects of the industrial processes related to RFID tag printing. At 805, the module responsible for capturing the RFID tag data, can execute and/or manage processes, programs (e.g., middleware), and/or other modules that can format, schedule, and/or organize the RFID tag data. Such organization of the RFID tag data can include a parse routine to isolate the RFID tag data that is meant to facilitate the RFID tag printing process and/or that can be encoded into one or more unique RFID tags.

At 810, the module can also direct the publication of messages based on the parsed RFID tag data that can assist one or more tag printers to each print at least one unique RFID tag. The messages can be in XML, Hypertext Markup Language (HTML), and/or conform to a predetermined code representing the information, for example. In addition, the parsed RFID tag data can simply be bits and/or a code meant to act as a key that can enable the tag printer to access RFID tag data located in the memory of another computer-related module that is included in the industrial environment, for example.

At 815, once the RFID tag data has been accessed by the tag printer, the tag printer can print and/or program one or more distinct RFID tags based on the RFID tag data. The printed tags can further be affixed to a manufactured good, a product, a set of items, or a package containing a product(s). The RFID tags can also be encoded with data related to other affixed tags. As an example, an RFID tag can store the serial number of a tag that was printed before and/or after the given RFID tag. Storing such data can be helpful for tracing quality issues concerning a production line as a whole, even as RFID tags get dispersed during a distribution process.

At 820, the one or more affixed tags can be sent through a verification procedure in which one or more RFID readers read at least one affixed RFID tag in order to verify proper operation of the RFID tag and proper data programming. The RFID reader can be associated with one or more antennas, which can be respectively directed at an area in which to read data from affixed RFID tags. The RFID readers can compare the data in the tag with a copy of the data produced and stored in the RFID printer and/or the module. The verification procedure can further separate the operative and affixed RFID tags from the inoperative and affixed RFID tags.

At 825, the one or more inoperative RFID tags, and the product(s) upon which the inoperative RFID tags are affixed can be directed to one or more procedures to correct any detected defects. For example, the entire tag printing process, starting at 800, can be initiated to reprint the defective RFID tag(s). Further, a procedure can separate the one or more affixed and inoperative RFID tags from their respective product(s) in order to properly discard the tags without wasting viable materials and product. Data associated with operative RFID tags can be transmitted to a global registry. The global registry can be accessible, for example, over the Internet, an Intranet, and/or via Personal Digital Assistants. Such data transmission can update the global registry with the data to enable inventory procedures, supply chain procedures, logistics and/or distribution procedures. Additionally, data associated with a payload of a recent set of tags can be emailed to a distribution center and/or the global registry.

Figure 9:
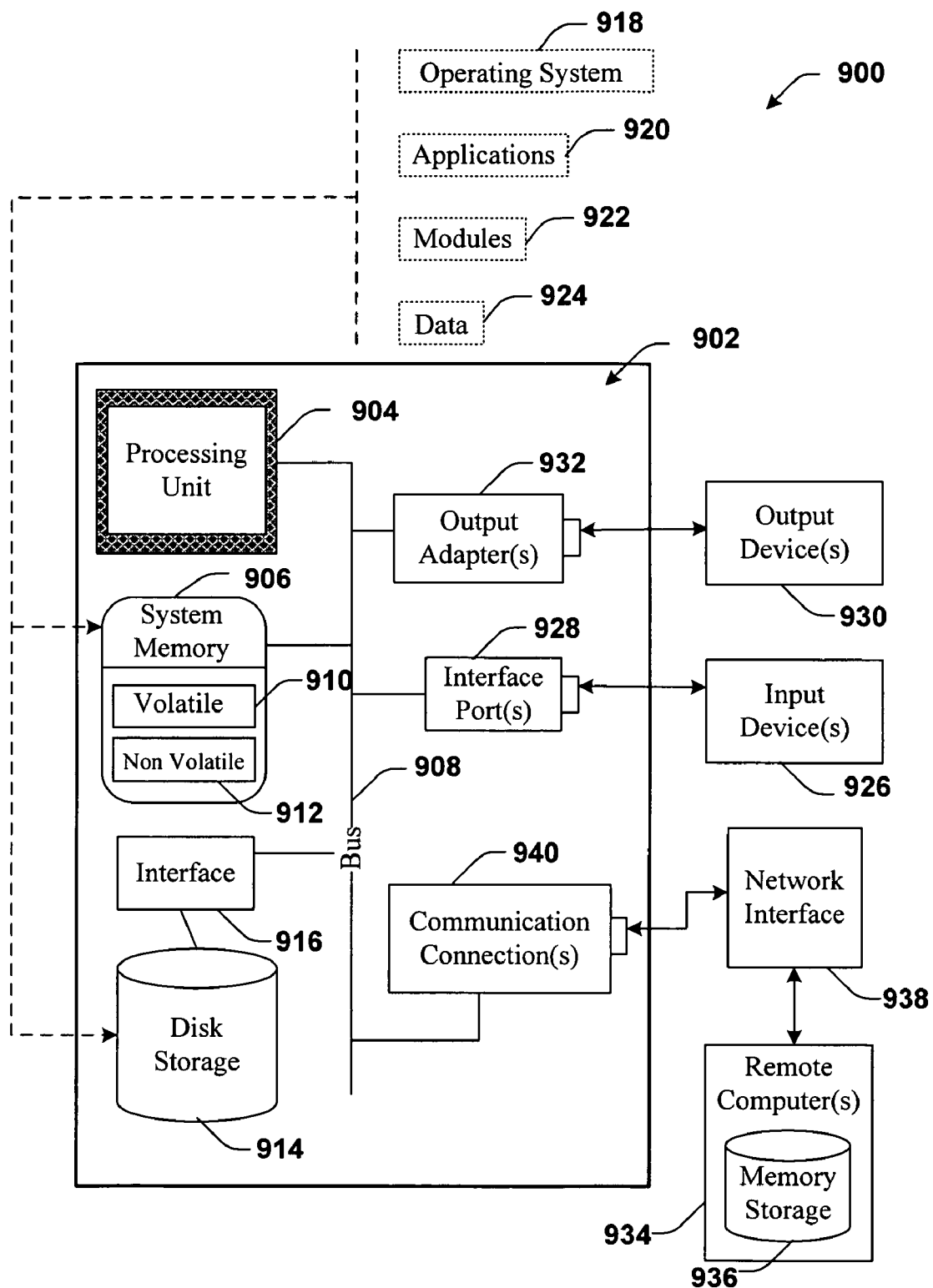
FIG. 9 is an exemplary environment for implementing various aspects of the invention utilizing a computer.

With reference to FIG. 9, an exemplary environment 900 for implementing various aspects of the invention includes a computer 902. The computer 902 includes a processing unit 904, a system memory 906, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, an 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI) technologies.

The system memory 906 includes volatile memory 910 and non-volatile memory 912. The basic input/output system (BIOS), containing the basic routines to transfer information between elements within the computer 902, such as during start-up, is stored in non-volatile memory 912. By way of illustration, and not limitation, non-volatile memory 912 can include read only memory (ROM), programmable ROM (PROM), electrically programmable ROM (EPROM), electrically erasable ROM (EEPROM), or flash memory. Volatile memory 910 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 902 also includes removable/non-removable, volatile/non-volatile computer storage media. FIG. 9 illustrates, for example, a disk storage 914. Disk storage 914 includes, but is not limited to, devices like a magnetic disk drive, floppy disk drive, tape drive, Jaz drive, Zip drive, LS-100 drive, flash memory card, or memory stick. In addition, disk storage 914 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used such as interface 916.

It is to be appreciated that FIG. 9 describes software that acts as an intermediary between users and the basic computer resources described in suitable operating environment 900. Such software includes an operating system 918. Operating system 918, which can be stored on disk storage 914, acts to control and allocate resources of the computer system 902. System applications 920 take advantage of the management of resources by operating system 918 through program modules 932 and program data 924 stored either in system memory 906 or on disk storage 914. It is to be appreciated that the subject invention can be implemented with various operating systems or combinations of operating systems.

A user enters commands or information into the computer 902 through input device(s) 926. Input devices 926 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 928. Interface port(s) 928 include, for example, a serial port, a parallel port, a game port, and a universal serial bus (USB). Output device(s) 930 use some of the same type of ports as input device(s) 926. Thus, for example, a USB port may be used to provide input to computer 902 and to output information from computer 902 to an output device 930. Output adapter 942 is provided to illustrate that there are some output devices 930 like monitors, speakers, and printers, among other output devices 930, which require special adapters. The output adapters 942 include, by way of illustration and not limitation, video and sound cards that provide a means of connection between the output device 930 and the system bus 908. It should be noted that other devices and/or systems of devices provide both input and output capabilities such as remote computer(s) 934.

Computer 902 can operate in a networked environment using logical connections to one or more remote computers, such as remote computer(s) 934. The remote computer(s) 934 can be a personal computer, a server, a router, a network PC, a workstation, a microprocessor based appliance, a peer device or other common network node and the like, and typically includes many or all of the elements described relative to computer 902. For purposes of brevity, only a memory storage device 936 is illustrated with remote computer(s) 934. Remote computer(s) 934 is logically connected to computer 902 through a network interface 938 and then physically connected via communication connection 940. Network interface 938 encompasses communication networks such as local-area networks (LAN) and wide-area networks (WAN). LAN technologies include Fiber Distributed Data Interface (FDDI), Copper Distributed Data Interface (CDDI), and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 940 refers to the hardware/software employed to connect the network interface 938 to the bus 908. While communication connection 940 is shown for illustrative clarity inside computer 902, it can also be external to computer 902. The hardware/software necessary for connection to the network interface 938 includes, for exemplary purposes only, internal and external technologies such as, modems including regular telephone grade modems, cable modems and DSL modems, ISDN adapters, and Ethernet cards.

Figure 10:
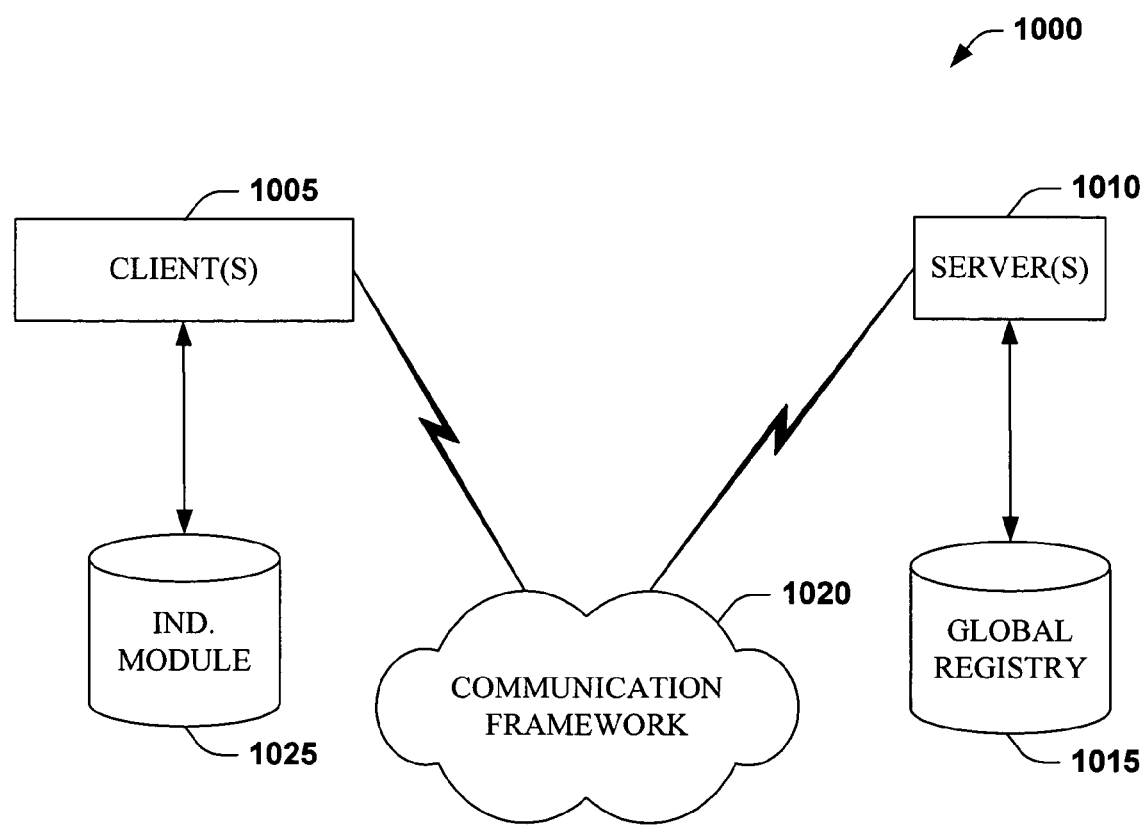
FIG. 10 is a schematic block diagram of a computing environment with which the subject invention can facilitate update of a global registry.

FIG. 10 is a schematic block diagram of a sample-computing environment with which the subject invention can facilitate the update of a global registry. The system 1000 includes one or more client(s) 1005. The client(s) 1005 can be hardware and/or software (e.g., threads, processes, computing devices). The system 1000 also includes one or more server(s) 1010. The server(s) 1010 can also be hardware and/or software (e.g., threads, processes, computing devices). The servers 1010 can house threads to perform transformations by employing the subject invention, for example. One possible communication between a client 1005 and a server 1010 can be in the form of a data packet adapted to be transmitted between two or more computer processes. For example, the data packet can be an email message and/or a reliable message containing data related to a recent set of tags created. The system 1000 includes a communication framework 920 that can be employed to facilitate communications between the client(s) 1005 and the server(s) 1010. The client(s) 1005 are connected to one or more industrial modules 1025 which can be employed to store and/or manage information local to the client(s) 1005. Similarly, the server(s) 1010 are connected to one or more supply chain global registries 1015 that can be employed to store information local to the servers 1010.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A tagging system, comprising:
   a printing component that prints a Radio Frequency Identification (RFID) tag based on unique RFID tag information, the printing of the RFID tag includes creating and encoding the RFID tag based on the unique RFID tag information;
   a software component of an industrial component that captures and communicates the unique RFID tag information to the printing component in a protocol compatible with the printing of an RFID tag, the industrial component manages a manufacturing process that includes affixing the RFID tag to an item of the manufacturing process, wherein the protocol includes an RFID tag communication protocol; and
   an RFID tag verification component that reads the RFID tag to verify proper encoding of the RFID tag.

2. The system of claim 1, the industrial component comprises one of: a programmable logic controller (PLC), an Ethernet module, or an industrial module.

3. The system of claim 1, further comprising an RFID tag programming module that encodes the RFID tag with data specific to the item.

4. The system of claim 3, the data comprises at least one of: item type data, packet logistics data, item quality data, item cost data, or item manufacture data.

5. The system of claim 1, further comprising a registry update module that updates a supply chain global registry with the data of the operative RFID tag.

6. The system of claim 1, the industrial component comprises an RFID information module that receives the RFID tag information from a network.

7. The system of claim 1, the RFID tag information is combined with other information received from at least one of: the printing component, an RFID reader, a PLC data tag, or a bar code reader.

8. The system of claim 1, the RFID tag information is further printed on the label of the RFID tag as at least one of text or graphics.

9. The system of claim 8, the graphics include a bar code or a color.

10. The system of claim 8, the text includes a visual representation of the RFID tag information on the label of the RFID tag in one of: a plain text or a cipher text.

11. The system of claim 10, the cipher text includes at least one of: alphanumeric encoding or non-alphanumeric encoding.

12. The system of claim 1, the printing component discovers product information via at least one of: a domain name server (DNS) or a dynamic DNS.

13. The system of claim 1, the printing component discovers product information via at least one of: a directory or a UDDI (Universal description, discovery and integration) lookup.

14. The system of claim 1, the industrial component includes at least one of: a PLC, an input/output component, a network interface component, or a human machine interface (HMI) component.

15. A system that facilitates printing of Radio Frequency Identification (RFID) tags, comprising:
   an RFID tag information component associated with a programmable logic controller (PLC), the PLC controls a manufacturing process and the RFID tag information component captures and publishes the RFID tag information, wherein the RFID tag information includes data contents of at least one RFID tag;

an RFID tag printer that receives the RFID tag information published by the RFID tag information component, prints an RFID tag based on the RFID tag information, wherein the RFID tag is affixed to an item of the manufacturing process controlled by the PLC, and wherein the RFID tag information is published in a format compatible with the RFID tag printer; and a verification component that reads the RFD tag, verifies proper operation of the RFID tag, and sends an error message to the PLC in response to detecting an RFID tag that fails verification.

16. The system of claim 15, the verification component verifies that contents of the RFID tag are correctly associated with the item.

17. The system of claim 15, the PLC manages placement of the RFID tag upon the item at a predetermined location on the item.

18. The system of claim 15, the verification component sends an update message to the PLC in response to detecting an RFID tag that passes verification.

19. The system of claim 15, the PLC comprises a registry update component that facilitates communication of item data of the RFID tag to a database.

20. The system of claim 19, the registry update component further compiles the item data of the RFID tag in the database to update a supply chain global registry.

21. The system of claim 15, further comprising a message broker to which the tag printer subscribes to receive the tag information.

22. The system of claim 21, the message broker utilizes a message queue telemetry transport (MQTT) protocol.

23. The system of claim 21, the message broker resides in the tag printer.

24. The system of claim 21, the message broker interfaces to an upper layer system that performs tag filtering.

25. The system of claim 21, the message broker is disposed as a standalone node on a network that is accessed by at least one of the tag printer and the PLC.

26. The system of claim 21, the message broker is integral to at least one of: a PLC, an input/output component, a network interface component, or an HMI component.

27. A method of managing a Radio Frequency Identification (RFID) tag global registry, comprising:

sending RFID tag data from a global registry to a programmable logic controller (PLC), the RFID tag data comprises at least one of: data generated by the PLC or data retrieved from the global registry;

publishing a message to a message queue wherein the message includes at least the RFID tag data;

accessing the message queue;

generating an RFID tag according to the message;

applying the RFID tag to an article of commerce during a manufacturing process;

verifying that the RFID tag is valid; and updating the global registry with information associated with the RFID tag.

28. The method of claim 27, further comprising obtaining a sample of a plurality of articles of commerce that have been placed into a container and verifying that the sample is valid.

29. The method of claim 27, the act of verifying is performed at least one of: before the RFID tag is applied to the article of commerce or before the article of commerce is placed into a container.

30. The method of claim 27, further comprising providing a message queue such that the tag printing system subscribes to the queue to receive the RFID tag data and print the RFID tag that encodes the RFID tag data.

31. The method of claim 27, the PLC generates an RFID tag ID and registers the RFID tag ID with the global registry.

32. A system that facilitates management of a global registry, comprising:

means for generating data to be encoded on a Radio Frequency Identification (RFID) tag associated with a programmable logic controller (PLC), wherein the data to be encoded includes at least one of: data generated by the PLC or data retrieved from the global registry;

means for publishing a message to a queue, wherein the message includes the RFID tag data;

means for generating an RFID tag according to the data encoded in the message published to the queue;

means for applying the RFID tag to an item during an assembly line process; and means for updating the global registry with information associated with the RFID tag including information about the item.

33. The system of claim 32, further comprising means for verifying that the RFID tag is operational, the RFID tag data is correct, and that the RFID tag is applied to the correct item.

* * * * *

UNITED STATES PATENT AND TRADEMARK OFFICE
CERTIFICATE OF CORRECTION

PATENT NO. : 7,636,044 B1  Page 1 of 1
APPLICATION NO. : 11/129199
DATED : December 22, 2009
INVENTOR(S) : David M. Callaghan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1060 days.

Signed and Sealed this

Ninth Day of November, 2010

David J. Kappos
*Director of the United States Patent and Trademark Office*